(12) United States Patent
Agrawal et al.

(10) Patent No.: US 8,953,189 B1
(45) Date of Patent: Feb. 10, 2015

(54) METHOD AND APPARATUS FOR VERIFYING PRINT JOBS TO PREVENT CONFIDENTIAL DATA LOSS

(75) Inventors: Mukund S. Agrawal, Pune (IN); Karan Khanna, Pune (IN)

(73) Assignee: Symantec Corporation, Mountain View, CA (US)

( * ) Notice: Subject to any disclaimer, the term of this patent is extended or adjusted under 35 U.S.C. 154(b) by 1067 days.

(21) Appl. No.: 12/539,573

(22) Filed: Aug. 11, 2009

(51) Int. Cl.
*G06K 15/00* (2006.01)

(52) U.S. Cl.
USPC ........................................ 358/1.14; 358/1.15

(58) Field of Classification Search
USPC ....................................................... 358/1.14
See application file for complete search history.

(56) References Cited

U.S. PATENT DOCUMENTS

| 7,526,645 | B2 * | 4/2009 | Miyazaki et al. | 713/167 |
| 2003/0081621 | A1 * | 5/2003 | Godfrey et al. | 370/400 |
| 2004/0125402 | A1 * | 7/2004 | Kanai et al. | 358/1.15 |
| 2005/0015600 | A1 * | 1/2005 | Miyazaki et al. | 713/176 |
| 2006/0075228 | A1 * | 4/2006 | Black et al. | 713/167 |
| 2006/0132842 | A1 * | 6/2006 | Nakamura | 358/1.15 |
| 2006/0259983 | A1 * | 11/2006 | Sperry | 726/28 |
| 2006/0265599 | A1 * | 11/2006 | Kanai | 713/182 |
| 2007/0115497 | A1 * | 5/2007 | Cowburn | 358/1.14 |
| 2008/0068641 | A1 * | 3/2008 | Dance et al. | 358/1.15 |
| 2009/0037980 | A1 * | 2/2009 | Kubo | 726/2 |
| 2009/0208142 | A1 * | 8/2009 | Treadwell et al. | 382/321 |
| 2010/0010968 | A1 * | 1/2010 | Redlich et al. | 707/3 |
| 2010/0031322 | A1 * | 2/2010 | Yuasa | 726/4 |

* cited by examiner

*Primary Examiner* — Benjamin O Dulaney
(74) *Attorney, Agent, or Firm* — Campbell Stephenson LLP (57) ABSTRACT

A method and apparatus for verifying print jobs to prevent confidential data loss is described. In one embodiment, the method for verifying print jobs using one or more processors to prevent confidential data loss from memory comprises processing a print job information associated with a document, comparing the plurality job information with a policy for identifying confidential data to produce a comparison result and communicating instructions to print at least one portion of the document based on the comparison result.

23 Claims, 6 Drawing Sheets

METHOD AND APPARATUS FOR VERIFYING PRINT JOBS TO PREVENT CONFIDENTIAL DATA LOSS

BACKGROUND

1. Field of the Invention

Embodiments of the present invention generally relate to data loss prevention (DLP) systems and, more particularly, to a method and apparatus for verifying print jobs to prevent confidential data loss.

2. Description of the Related Art

Within a typical computing environment, small to large organizations generate a significant amount of mission critical data related to various operations (e.g., business transactions, administration, resource management, manufacturing, providing services, and/or the like). The mission critical data may include confidential data (e.g., non-public fiscal policies, trade secrets, legal documents, employee's personal data (e.g., social security number, credit card number), intellectual property, business strategies (e.g., marketing and/or production plans), source code and the like). Such confidential data may be inadvertently or intentionally communicated from an endpoint (e.g., a computer, a laptop and/or the like) to a peripheral device, such as a printer.

Printers, for example, may be installed in common areas (e.g., a community printer) and represent potential points of confidential data loss because the printers are easily accessible to many employees. A coworker may accidently or intentionally obtain documents containing the confidential data. The coworker may also withhold these documents from management and leave the facility with the confidential data. In some instances, the printer may be located at a remote location (e.g., at another floor, at another building and/or the like) and/or the user may forget to collect the printed documents. As such, the printed documents containing the confidential data may be unknowingly disclosed to unauthorized employees and visitors. These printers cannot determine which documents include the confidential data and which do not. The printers simply process one or more print jobs and execute instructions for printing various documents.

Various Data Loss Prevention (DLP) software programs are employed to detect and prevent the confidential data loss from various endpoints (e.g., computers) but are unable to instruct the printers to authenticate the print jobs for documents having the confidential data before printing. The DLP software programs simply employ a brute force approach to disabling these print jobs. However, a user may still desire to print one or more documents that include the confidential data. For example, an inventor may desire to print an Invention Disclosure Form (IDF) for review and discussion with a patent filtering committee and/or the like. Current data loss prevention software programs, unfortunately, are unable to verify the print job for the IDF.

Therefore, there is a need in the art for a method and apparatus for verifying print jobs to prevent confidential data loss.

SUMMARY OF THE INVENTION

Embodiments of the present invention comprise a method and apparatus for verifying print jobs to prevent confidential data loss is disclosed. In one embodiment, the method for verifying print jobs using one or more processors to prevent confidential data loss from memory comprises examining print job information associated with a document, comparing the print job information with policy information for identifying confidential data to produce a comparison result and printing at least one portion of the document based on the comparison result.

In some embodiments, instructions to print the at least one portion of the document may be communicated based on the comparison result. In some embodiments, the policy information may include at least one signature for identifying the confidential data within the document. In some embodiments, instructions may be routed to a printer in close proximity to a computer. In some embodiments, the document may be classified by applying a machine learning technique to the print job information. In some embodiments, the document may be scanned to identify the confidential data. In some embodiments, the print job information and the policy information may be transformed into the at least one printed portion of the document. In some embodiments, at least one portion of a redacted document may be printed based on the comparison result.

In some embodiments, a degree of confidentiality associated each document of the document is determined. In some embodiments, an alphanumerical sequence for authenticating a document of the document may be generated. In some embodiments, a match between the random alphanumerical sequence and a user entered alphanumerical sequence may be identified and the document of the document is printed.

In another embodiment, a computer-readable-storage medium comprising one or more processor-executable instructions that, when executed by at least one processor, causes the at least one processor to process print job information associated with a document compare the print job information with policy information for identifying confidential data to produce a comparison result and execute instructions to print at least one portion of the document based on the comparison result.

In some embodiments, the one or more processor-executable instructions may generate a random alphanumerical sequence for authenticating a document of the document. In some embodiments, the one or more processor-executable may communicate instructions to print the at least one portion of the document based on the comparison result. In some embodiments, the one or more processor-executable instructions may identify a closest printer to a computer that initiated at least one print job and route instructions to the closest printer.

In some embodiments, the one or more processor-executable instructions may identify a match between the random alphanumerical sequence and a user entered alphanumerical sequence and print the document of the document. In some embodiments, the one or more processor-executable instructions may transform the print job information and the authentication into the at least one printed portion of the document.

In yet another embodiment, a system for verifying print jobs to prevent confidential data loss, comprising one or more processors, and memory storing instructions executable on the one or more processors to process print job information associated with a document, compare the print job information with policy information for identifying confidential data to produce a comparison result and print at least one portion of the document based on the comparison result. In some embodiments, the system further includes one or more instructions to generate a random alphanumerical sequence for authenticating the document. In some embodiments, the system further includes one or more instructions to identify a match between the random alphanumerical sequence and a user entered alphanumerical sequence.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As explained in detail further below, various embodiments of the present disclosure enable print job verification to prevent confidential data loss. In some embodiments, a comparison module may be configured with various data loss prevention policies. The comparison module applies such information to a plurality of print jobs in order to identify confidential data within one or more documents. As an example, the comparison module blocks the printing of any document having highly sensitive information before such a document reaches a peripheral device, such as a printer. As another example, the comparison module instructs the peripheral device to print a particular document after comparing an alphanumerical sequence with a user entered alphanumerical sequence. If a print module (e.g., a print module 414 of FIG. 4) identifies a match, the print module prints the particular document.

Figure 1:
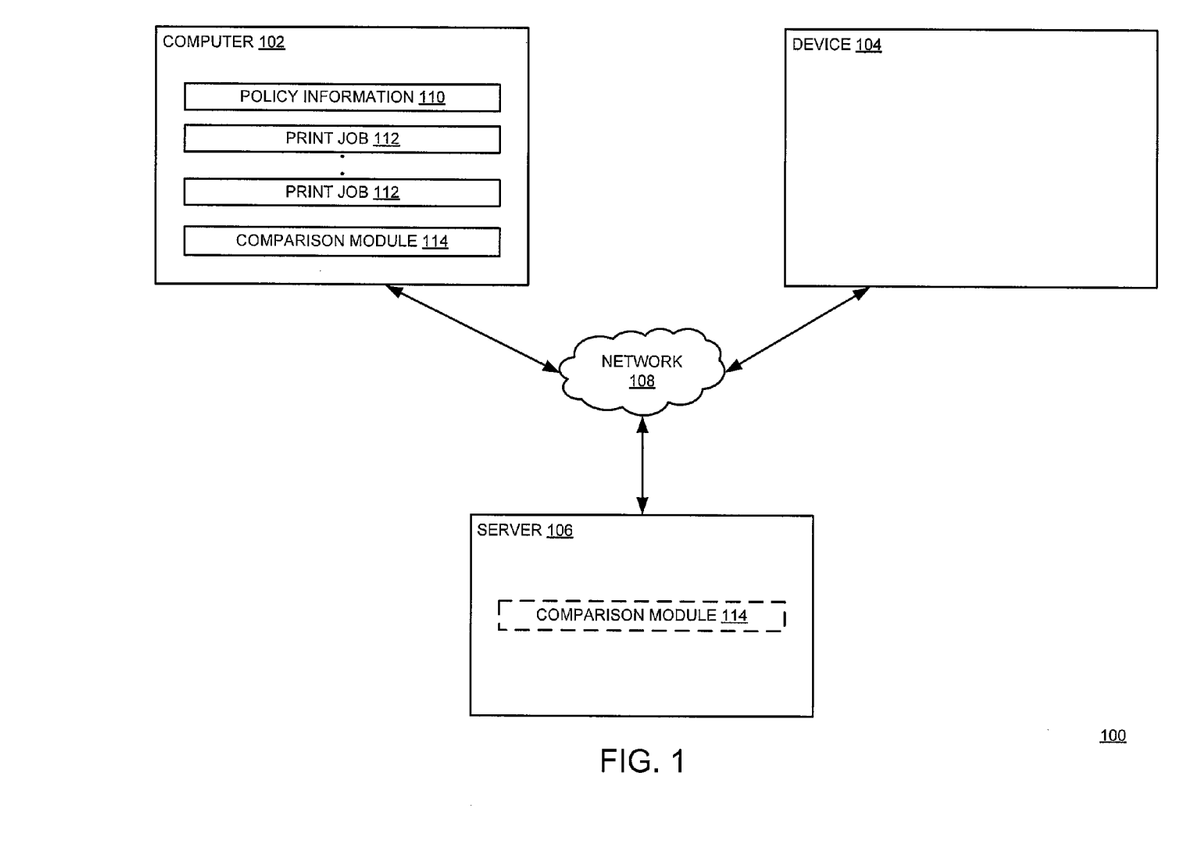
FIG. 1 is a block diagram of a system for verifying print jobs to prevent confidential data loss, according to one or more embodiments.

FIG. 1 is a block diagram of a system 100 for verifying print jobs to prevent confidential data loss according to various embodiments. In some embodiments, the system 100 may form a computing environment that includes a computer 102, a device 104 and a server 106, where each component is coupled to each other through a network 108.

Generally, the computer 102 may be a type of computing device (e.g., a laptop, a desktop, a terminal and/or the like) known to one of ordinary skill in the art having the benefit of this disclosure. A user may utilize various software applications (e.g., MICROSOFT Word, MICROSOFT Excel, MICROSOFT PowerPoint, ABOBE Acrobat Reader and/or the like) to create the one or more documents on the computer 102. For example, these software applications may create spreadsheets, salary slips, order forms, database records, articles and/or the like. In some embodiments, the one or more documents may include confidential data as explained further below. The user computer 102 includes various software packages, such as a security agent 110. The user computer 102 may include a plurality of print jobs 112.

The device 104 may be a type of peripheral computing device (e.g., including but not limiting to a printer, a copier, a plotter, a laser printer, a fax machines, an ink jet printer, a Multi-Function Peripherals (MFPs) and/or the like) that supports various functions for one or more computers, such as the computer 102. The device 104, for example, may be a communal printer for the one or more computers. The device 104 may also be a printer that is in close proximity to the computer 102. In some embodiments, the device 104 may be configured to process the print jobs 112 communicated by the computer 102 and produce printed versions of a plurality of documents. The device 104 may include various software packages for managing the plurality of print jobs 112 and printing one or more portions of the plurality of documents. In some embodiments, the device 104 may include a comparison module 114 as explained further below.

The server 106 may be a type of computing device (e.g., a laptop, a desktop and/or the like) known to one of ordinary skill in the art having the benefit of this disclosure. The server 106 includes various software packages for providing application and data services to one or more computers, such as the computer 102. Optionally, the server 106 may be configured to manage the plurality of print jobs 112 and communicate instructions for printing the plurality of documents. In some optional embodiments, the server 106 may be in close proximity to the device 104. In one or more optional embodiments, the server 106 includes the comparison module 114 as explained further below.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the Internet or Intranet using various communications infrastructure such as Ethernet, WiFi, WiMax, General Packet Radio Service (GPRS), and the like.

In some embodiments, the policy information 110 may include one or more signatures (e.g., hash values, fingerprints and/or the like) for identifying the confidential data as explained further below. In some embodiments, the policy information 110 may refer to one or more machine learning techniques for identifying the confidential data. In some embodiments, the policy information 110 may include a unique and/or random alphanumerical sequence (e.g., a code) associated with a particular print job. For example, the policy information 110 may define a range of Internet Protocol (IP) addresses of one or more devices that are in close proximity to the computer 102. The policy information 110 may also define additional parameters, such as a domain name, a subnet, a floor number, a building name and/or the like. In some embodiments, the policy information 110 may specify which peripheral devices (e.g., printers) form a portion of an Active Directory domain. In another embodiment, the policy information 110 may also indicate one or more peripheral devices that support authentication using a Lightweight Directory Access Protocol (LDAP) server.

According to various embodiments, the user of the computer 102 may initiate print commands associated a plurality of documents. The examination module 110 may utilize various software packages, such as an operating system and device drivers, to initiate and communicate instructions for printing these documents. These software packages may queue the plurality of documents and store information associated with each print job (e.g., an IP address of a destination printer) into the plurality of print jobs 112. For example, each print job 112 may include various attributes associated with one or more documents, such as a unique identifier, file type, document size, a number of pages and/or the like.

In some embodiments, the comparison module 114 includes software code (e.g., processor executable instructions) that may be configured to compare information associated with the plurality of print jobs 112 with the policy information 110 to identify the confidential data within one or more documents as explained further below. In one or more embodiments, the comparison module 114 may be an agent (e.g., a data loss prevention (DLP) agent) that is configured with one or more user-defined and/or administrator-defined policies for identifying the confidential data. In some embodiments, the comparison module 114 communicates instructions to the device 104 for verifying the print jobs 112 and printing one or more documents.

For example, the comparison module 114 may communicate a randomly-generated alphanumerical sequence for authenticating a particular print job associated with a document that includes the confidential data. Alternatively, the comparison module 114 may communicate a user name to a printer within a certain Active Directory domain. The user must enter a corresponding Active Director password to print the document. Similarly, the comparison module may communicate the user name to the LDAP server of which the user must enter an appropriate LDAP password.

In yet another embodiment, the device 104 may be a peripheral device that is coupled to a magnetic card reader. In order to print the document having the confidential data, the user must swipe an access card (e.g., an employee ID card) to authenticate the particular print job. In some embodiments, the device 104 may include a biometric authentication device that verifies the particular print job after the user submits a matching fingerprint and/or retinal scan.

Figure 2:
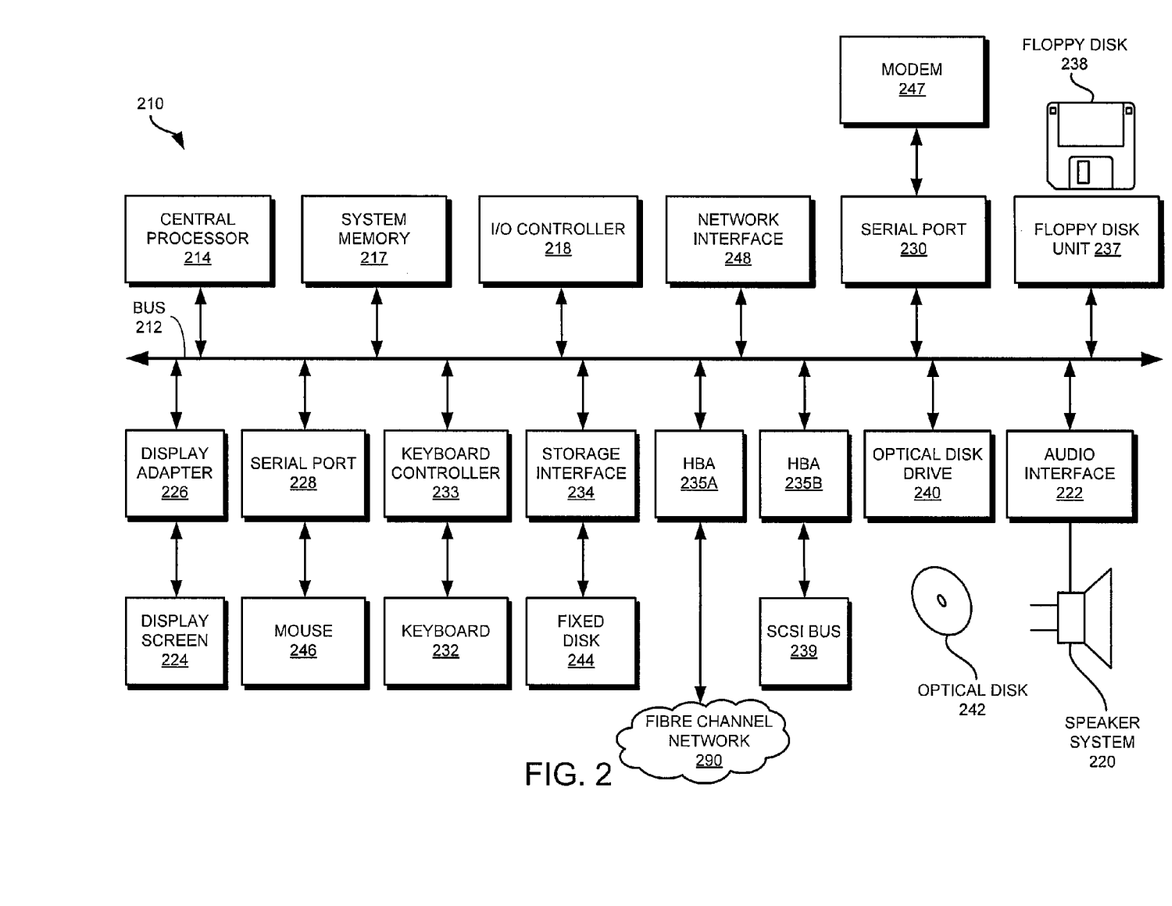
FIG. 2 is a block diagram of a suitable computer for implementing the present disclosure, according to one or more embodiments.

FIG. 2 is a block diagram of a computer system 210 suitable for implementing the present disclosure. This system 210 is representative of a computer system that can be used to implement the computer 102 and/or the server 106 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
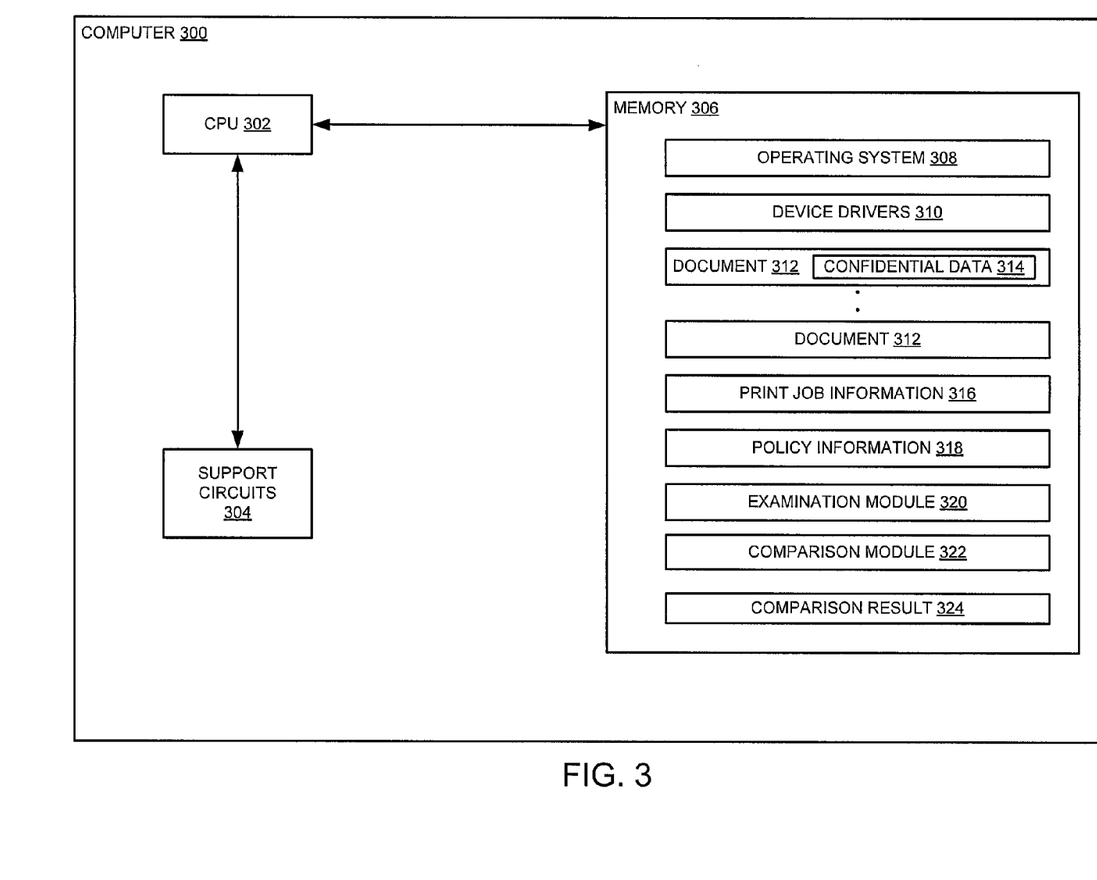
FIG. 3 is a block diagram of a computer for verifying print jobs to prevent confidential data loss, according to one or more embodiments.

FIG. 3 is a block diagram of a computer 300 for verifying print jobs to prevent confidential data loss according to various embodiments. The computer 300 is a type of computing device (e.g., a laptop, a desktop and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes an operating system 308 and device drivers 310 as well as various software packages and data, such as a plurality of documents 312, print job information 316, policy information 318, an examination module 320, a comparison module 322 and a comparison result 324.

The operating system 308 generally manages various computer resources (e.g., network resources, data storage resources, file system resources and/or the like). The operating system 308 is configured to execute operations on one or more hardware and/or software devices, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a NIC card to communicate data to another computer as explained further below.

A user may utilize various software applications to create the plurality of documents 312 as explained in the present disclosure. The user may invoke requests to print one or more documents at a local or network printer (e.g., the device 104 of FIG. 1). In one or more embodiments, one or more portions of the plurality of documents 312 may include confidential data 314. The confidential data 314 may include non-public fiscal policies, private financial information, trade secrets, legal documents, employee's personal data (e.g., social security number, credit card number), intellectual property, critical business strategies (e.g., marketing and/or production plans), source code and/or the like as explained in the present disclosure. For example, the user may initiate commands to print a document that includes a patentable invention and/or a social security number.

In some embodiments, the policy information 318 may refer to one or more data loss prevention policies and/or confidentiality policies. In some embodiments, the policy information 318 may be communicated to a peripheral device (e.g., the device 104 of FIG. 1) and/or a server (e.g., the server 106 of FIG. 1) in order to verify one or more print jobs. In some embodiments, the policy information 318 may include one or more signatures (e.g., hash values, fingerprints and/or the like) for identifying the confidential data 314 within the plurality of documents 312. In some embodiments, the policy information 318 may refer to one or more machine learning techniques for identifying the confidential data 314. For example, a machine learning technique (e.g., a Bayesian classifier) may be applied to the print job information 516 to classify the plurality of documents 312 based on the confidential data 314.

According to various embodiments, the policy information 318 may include a unique and/or random alphanumerical sequence (e.g., a code) associated with a particular print job. At the peripheral device, such as a printer, the policy information 318 may be utilized to verify the particular print job before printing one or more documents having the confidential data 314. For example, the alphanumerical sequence may be displayed to the user after initiated various commands to print a certain document. Then, the alphanumerical sequence may be communicated to a server (e.g., the server 106 of FIG. 1) and/or the peripheral device where the user must enter a matching alphanumerical sequence in order to authenticate the particular print job. After identifying a match, the server communicates instructions to the peripheral device to print the certain document.

According to some embodiments, the examination module 320 includes software code (e.g., processor executable instructions) that may be stored in the memory 306 and executed by the CPU 302 to examine the print job information 316. The user may initiate various print jobs for the plurality of documents 312 through the operating system 308 and/or the device drivers 310. As soon as the user initiates these print commands, the examination module 320 intercepts each and every print command and generates the print job information 316. In some embodiments, the print job information 316 may include attributes associated with each print job, such as a unique print job identifier, a file type or file extension, a document size, a number of pages, a user name, a computer name, a destination printer identifier and address and/or the like.

In one embodiment, the comparison module 322 includes software code (e.g., processor executable instructions) stored in the memory 306, which when executed by the CPU 406, compares the print job information 316 with the policy information 318 to produce the comparison result 324. As explained in the present disclosure, one or more portions of the plurality of documents 312 are print based on the comparison result 324. For example, the comparison result 324 indicates that one or more documents include various forms of non-public intellectual property. The comparison result 324 may further indicate a degree of confidentiality associated with each document of the plurality of documents 312. For example, the comparison result 324 may indicate that a particular document includes highly sensitive information that cannot be printed for any reason.

In some embodiments, the comparison module 322 may communicate instructions to the peripheral device, such as a printer, to print the one or more documents having the non-public intellectual property after the user inputs a matching alphanumerical sequence and/or block the printing of the particular document having the highly sensitive information. In some embodiments, the comparison module 322 configures an attribute (e.g., a flag) to activate private printing on the peripheral device. As soon as the user inputs the matching alphanumerical sequence at the server and/or the peripheral device, the one or more documents are printed. By forcing user to collect printed copies of the one or more documents, the comparison module 322 prevents inadvertent and/or intentional loss of the confidential data 314. Alternatively, the comparison module 322 may instruct the peripheral device to only print portions of the one or more documents that does not include the confidential data 314. As such, the peripheral device omits printing the confidential data 314 and prints each and every remaining portion instead.

In some embodiments, through a computer display (e.g., the monitor), the comparison module 322 presents various forms of information to the user. In some embodiments, the comparison module 322 may produce an alert to the user of the computer 102 that reflect the confidentiality for one or more documents of the plurality of documents 312. For example, the comparison module 322 may alert the user as to the highly sensitive information within the particular document. The comparison module 322 may also inform the user to input the matching alphanumerical sequence at the server and/or the peripheral device. The comparison module 322 may configure the alert to periodically recur on a computer display until the user collects printed versions of the one or more documents.

Figure 4:
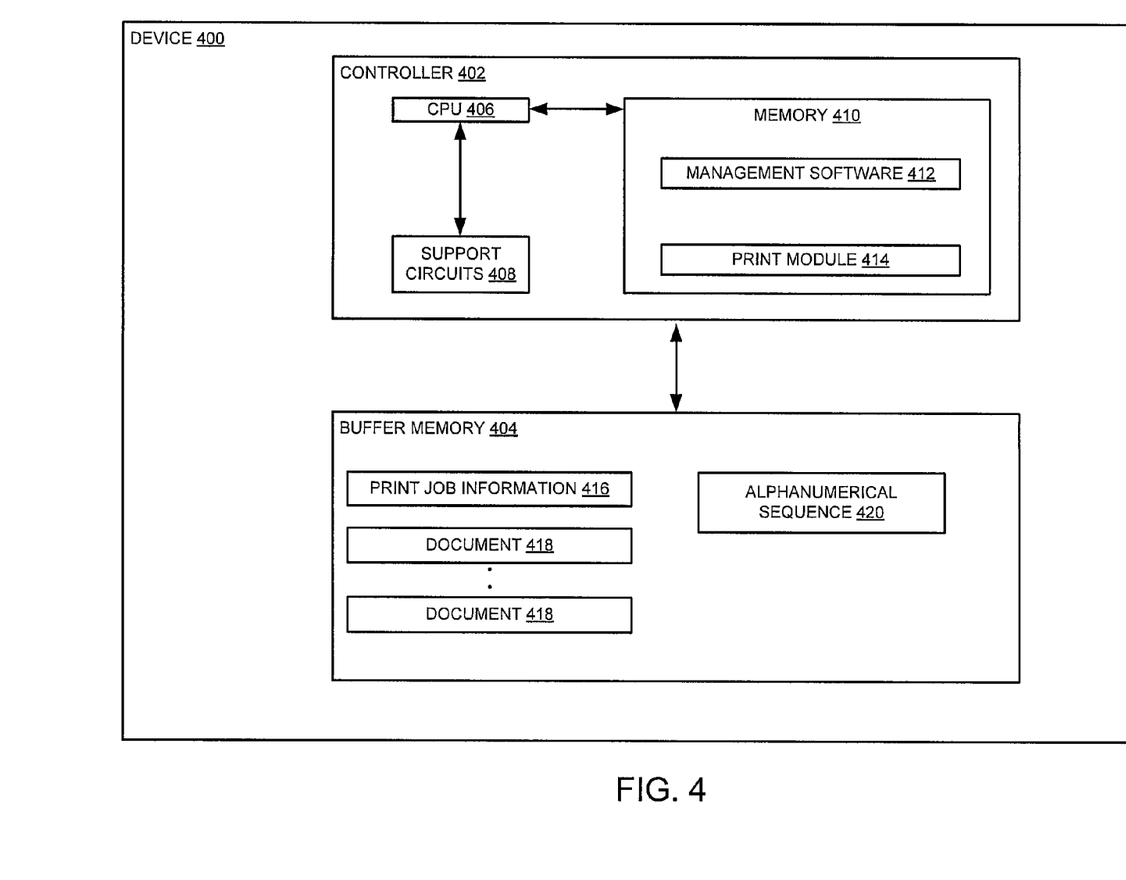
FIG. 4 is a block diagram of a device for verifying print jobs to prevent confidential data loss, according to one or more embodiments.

FIG. 4 is a block diagram of a device 400 for verifying print jobs to prevent confidential data loss according to one embodiment. The device 400 may be a type of peripheral device (e.g., including but not limiting to a printer, a copier, a plotter, a fax machine, an ink jet or laser printer, a Multi-Function Peripherals (MFPs) and/or the like) for processing print jobs (e.g., the print jobs 112 of FIG. 1). The device 400 receives the print jobs from a computer (e.g., the computer 102 of FIG. 1) and prints one or more portions of a plurality of documents 418 as instructed. In some embodiments, the device 400 includes various hardware components, such as a controller 402 and a buffer memory 404.

According to various embodiments, the controller 402 comprises a Central Processing Unit (CPU) 406, various support circuits 408 and a memory 410. The CPU 406 may comprise one or more commercially available microprocessors or microcontrollers that facilitate data processing and storage. Various support circuits 408 facilitate operation of the CPU 406 and may include clock circuits, buses, power supplies, input/output circuits and/or the like. The memory 410 includes a read only memory, random access memory, disk drive storage, optical storage, removable storage, and the like. The memory 410 includes various software packages for servicing a plurality of print jobs and printing one or more documents, such as management software 412 and a print module 414.

The buffer memory 404 includes print job information 416, a plurality of documents 418 and the policy information 420. In some embodiments, a plurality of print jobs may be initiated by a user of a computer (e.g., the computer 102 of FIG. 1 and the computer 300 of FIG. 3). The print job information 416 may refer to a plurality of print jobs that are organized into a queue (e.g., a First-In First-Out (FIFO) and/or the like) and communicated to the management software 412. One or more documents 418 may include confidential data (e.g., the confidential data 314 of FIG. 3). In some embodiments, print jobs associated with these documents may be suspended and/or paused unless the user inputs an alphanumerical sequence 420.

In one embodiment, the management software 412 includes software code (e.g., processor executable instructions) stored in the memory 410, which when executed by the CPU 406, processes the print job information 416 and manages the plurality of print jobs. In one embodiment, the management software 412 instructs various hardware components to print one or more portions of the documents 418 as instructed by the print module 414.

In some embodiments, the print module 414 includes software code (e.g., processor executable instructions) stored in the memory 410, which when executed by the CPU 406, prints one or more portions of the plurality of documents 418. In some embodiments, a comparison module (e.g., the comparison module 114 of FIG. 1 and/or the comparison module 322 of FIG. 3) may instruct the print module to block the printing of a particular document. In some embodiments, the comparison module may instruct the print module 414 to print one or more documents after the user inputs a matching copy of the alphanumerical sequence 420.

Figure 5:
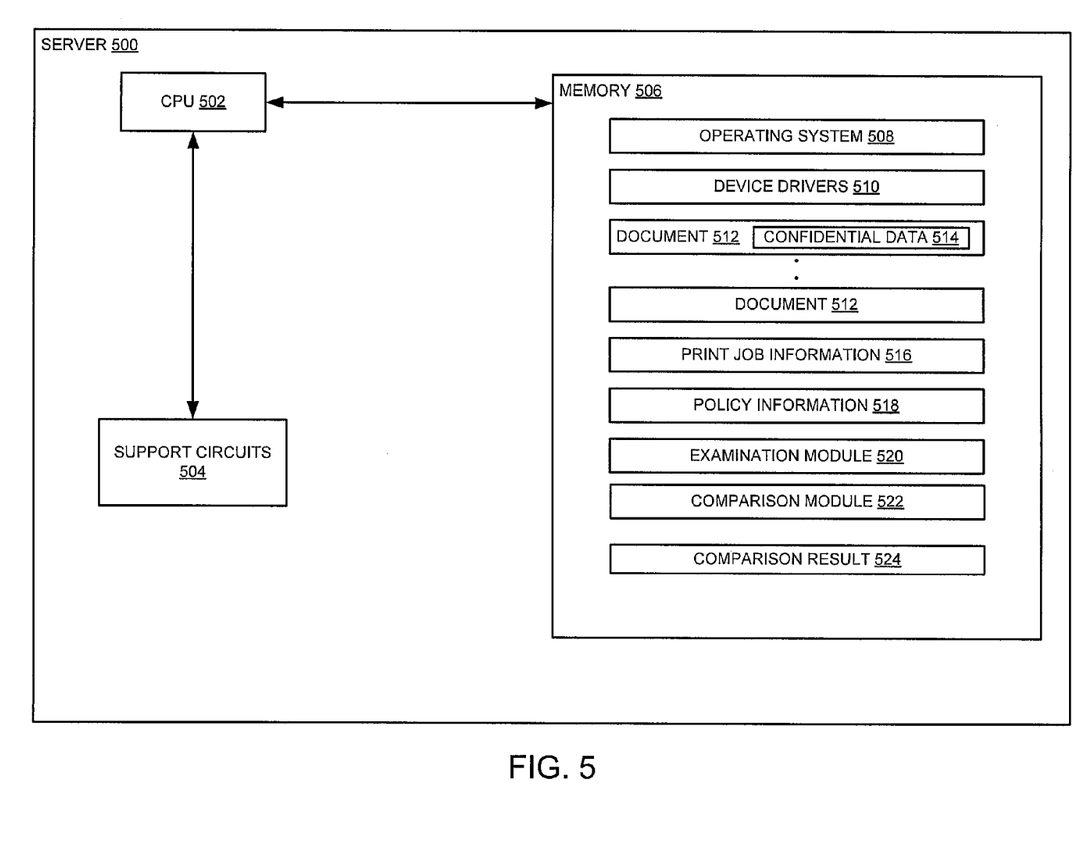
FIG. 5 is a block diagram of a server for verifying print jobs to prevent confidential data loss, according to one or more embodiments.

FIG. 5 is a block diagram of a server 500 for verifying print jobs to prevent confidential data loss according to one embodiment. The server 500 is a type of computing device (e.g., a laptop, a desktop and/or the like) that comprises a Central Processing Unit (CPU) 502, various support circuits 504 and a memory 506. The CPU 502 may comprise one or more commercially available microprocessors or microcontrollers that facilitate data processing and storage. Various support circuits 504 facilitate operation of the CPU 502 and may include clock circuits, buses, power supplies, input/output circuits and/or the like. The memory 506 includes a read only memory, random access memory, disk drive storage, optical storage, removable storage, and the like. The memory 506 includes various software packages and data, such as an operating system 508 and device drivers 510 as well as a plurality of documents 512, print job information 516, policy information 518, an examination module 520, a comparison module 522 and a comparison result 524.

The operating system 508 generally manages various computer resources (e.g., network resources, data storage resources, file system resources and/or the like). The operating system 508 is configured to execute operations on one or more hardware and/or software devices, such as Network Interface Cards (NICs), hard disks, virtualization layers, firewalls and/or the like. For example, the various software packages call commands associated with the operating system 508 (i.e., native operating system commands) to perform various file system and/or storage operations, such as creating files or metadata, writing data to the files, reading data from the files, modifying metadata associated with the files and/or the like. The operating system 508 may call one or more functions associated with the device drivers 510 to execute various file system and/or storage operations. As an example, the operating system 508 may utilize a device driver associated with a NIC card to communicate data to another computer as explained further below.

According to various embodiments, one or more computers (e.g., the computer 102 of FIG. 1 and the computer 300 of FIG. 3) initiate a plurality of print jobs and communicates the plurality of documents 512 to the server 500 on route to a peripheral device (e.g., the device 400 of FIG. 4), such as a printer. For example, the server 500 may be a print server that manages the plurality of print jobs within a networked computing environment. In some embodiments, one or more of the documents 512 may include confidential data 514. The print job information may include various attributes associated with each print job, such as a unique print job identifier, a file type or file extension, a document size, a number of pages, a user name, a computer name, a destination printer identifier and address and/or the like.

In some embodiments, the policy information 518 may be utilized to identify the confidential data 514 within the plurality of documents 512. For example, the policy information 518 may indicate a file type (e.g., a .PDF file) and/or a document name that must not be printed. As another example, the policy information 518 may include a signature (e.g., a hash value, a fingerprint and/or the like) associated with the confidential data 514. Any document having a matching signature of the plurality of documents 512 includes the confidential data 514.

In some embodiments, an examination module 520 (e.g., the examination module 110 of FIG. 1 and the examination module 320 of FIG. 3) may include software code (e.g., processor executable instructions) that is stored in the memory 516. The CPU 502 may recall the software code from the memory 506 in order to process the plurality of print jobs and generate the print job information 516 associated with the plurality of documents 512 as explained in the present disclosure.

In some embodiments, a comparison module 522 includes software code (e.g., processor executable instructions) stored in the memory 506. The CPU 502 may execute the software code in order to compare the print job information 516 with the policy information 518 to produce the comparison result 524 (e.g., the comparison result 324 of FIG. 3) as explained in the present disclosure. In some embodiments, the comparison module 522 scans the plurality of documents 512 to identify the confidential data 514. If the comparison module 522 determines that one or more documents include the confidential data 514 of the plurality of documents 512, the comparison module 522 examines one or more policies to identify an appropriate data loss prevention technique.

For documents that include low-risk information, the comparison module 522 may generate an alphanumeric sequence for verifying the print job at the peripheral device. In one embodiment, the comparison module 522 may generate a random, unique alphanumerical sequence for each document of the plurality of documents 512. In some embodiments, the comparison module 522 identifies a document having a file type that cannot be printed. For example, the comparison module 522 may permit the printing of .DOC documents but instructs a peripheral device to block the printing of any .PDF documents.

Figure 6:
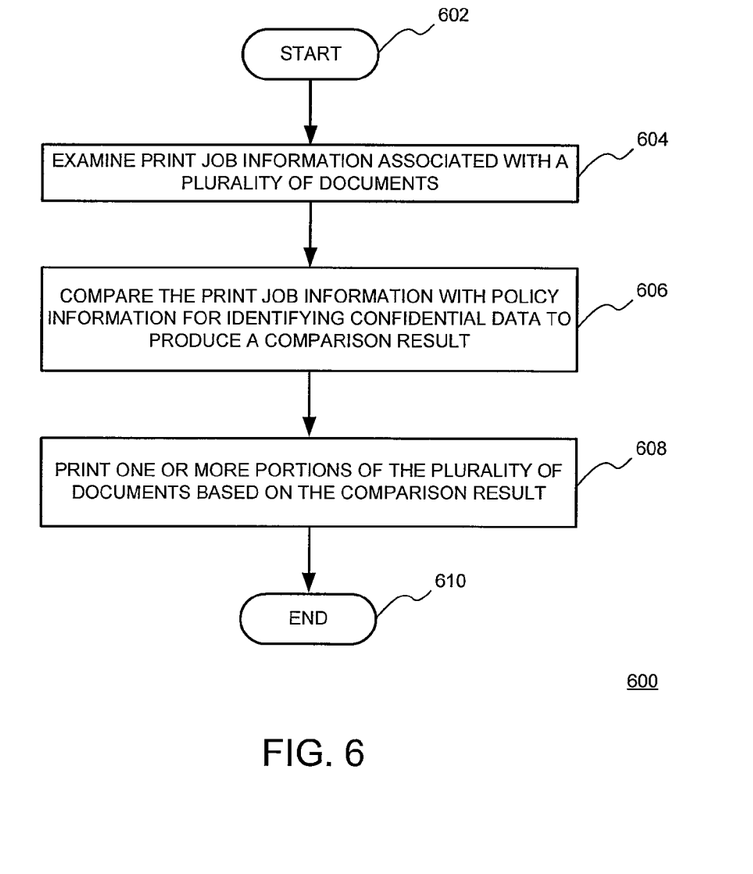
FIG. 6 is a flow diagram of a method for verifying print jobs to prevent confidential data loss, according to one or more embodiments.

FIG. 6 is a flow diagram of a method 600 for verifying print jobs to prevent confidential data loss according to one embodiment. In some embodiments, various software modules cooperate to transform print job information (e.g., the print job information 316 of FIG. 3 and the print job information 516 of FIG. 5) and policy information (e.g., the policy information 318 of FIG. 3 and the policy information 518 of FIG. 5) into printed versions of one or more documents associated with one or more print jobs. The method 600 starts at step 602 and proceed to step 604, at which the print job information may be examined. In some embodiments, an examination module is executed by one or more processors to examine a plurality of print jobs and identify various attributes associated with a document, such as a file type, a file name, an owner identifier, a computer name and/or the like.

At step 606, the print job information is compared with policy information to produce a comparison result. In some embodiments, a comparison module (e.g., the comparison module 322 of FIG. 3) may be configured in accordance with one or more user-defined and/or administrator-defined policies. Such policies enable the comparison module to identify one or more forms of confidential data within a plurality of documents. In some embodiments, the comparison module scans the document to identify one or more documents having the confidential data. For example, the comparison module may calculate a signature for a particular document and compare the signature with one or more signatures associated with the confidential data.

At step 608, the one or more portions of the document are printed. Based on the comparison result, the comparison module communicates one or more instructions for printing the document according to one or more embodiments. For example, the comparison module cooperates with a print module running on the device to block one or more documents having highly sensitive information and/or permit the printing of one or more documents having low-risk information after the user enters a matching alphanumerical sequence. In some embodiments, the comparison module identifies a closest printer to a computer that initiated a particular print job. The comparison module responds by routing instructions for printing the particular print job to the closest printer.

Optionally, at step 610, one or more portions of a redacted document may be printed. In some embodiments, the print module may partially print the document based on the comparison result. The comparison result, for example, may indicate that a DLP policy (e.g., the policy information 318 of FIG. 3) may permit the printing of the document if certain portions are edited. The comparison module communicates instructions for revising the document to the device. The print module, in response, blackens or omits the certain portions during the printing of the redacted document according to some embodiments. The method 600 proceeds to step 612, where the method 600 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method in a computer system, comprising:
preventing confidential data loss by verifying a print job, using one or more processors of the computer system, comprising
in response to a print command, examining print job information, wherein
the print job information is associated with the print job, and
the print job is configured to be processed to produce a printed version of a document,
determining whether the document comprises confidential data by
calculating a first signature for the document, and
processing the first signature using policy information, wherein
the policy information comprises
information indicating that one or more devices support authentication using a Lightweight Directory Access Protocol (LDAP) server,
information for a machine learning technique configured to identify the confidential data,
an alphanumeric sequence associated with the print job, and
one or more internet protocol addresses of one or more devices associated with the computer system,
the policy information is configured to be used in making a first determination as to whether the document comprises the confidential data,
the first signature is configured to identify the confidential data within the document,
the processing produces a result that indicates the document comprises the confidential data, in response to the first determination indicating that the document comprises the confidential data, and
making a second determination as to whether to print at least a portion of the document, wherein
the determination is based on the result.

2. The method of claim 1, wherein the making the second determination comprises:
if the second determination indicates that the at least the portion of the document is to be printed, communicating instructions to print the at least the portion of the document.

3. The method of claim 1, wherein the first signature is configured to identify the confidential data by virtue of comprising one of a hash value or a fingerprint.

4. The method of claim 1, wherein the making the second determination comprises:
routing instructions to a printer local to a computer.

5. The method of claim 1, wherein the determining whether the document comprises the confidential data further comprises:
classifying the document by applying a machine learning technique to the print job information, wherein
the machine learning technique applies a Bayesian classifier to the print job information.

6. The method of claim 1, wherein the determining whether the document comprises the confidential data further comprises:
identifying the confidential data by scanning the document.

7. The method of claim 1, further comprising:
transforming the print job information and the policy information into the at least the portion of the document.

8. The method of claim 1, wherein the determining whether the document comprises the confidential data further comprises:
determining a degree of confidentiality of the document.

9. The method of claim 1, further comprising:
in response to the comparison result indicating that the document comprises the confidential data, generating an alphanumerical sequence for authenticating the document.

10. The method of claim 9, further comprising:
transmitting the print job and the alphanumerical sequence to a destination printer;
suspending the document from being printed by the destination printer until a matching alphanumerical sequence has been entered by a user at the destination printer;
determining whether a match exists between the alphanumerical sequence and a user entered alphanumerical sequence; and
if the match exists, printing the document.

11. The method of claim 10, wherein the printing comprises:
printing at least one portion of a redacted document, wherein
the printing is performed based on the comparison result.

12. The method of claim 1, further comprising
comparing the print job information and policy information, wherein
the comparing the print job information and the policy information indicates whether the document comprises the confidential data.

13. The method of claim 12, wherein
the print job information comprises one or more attributes, and
the one or more attributes comprise at least one of
a user name, a computer name, a destination printer identifier, one or more file attributes of the document, or a print job identifier.

14. The method of claim 1, wherein the policy information is used to determine whether one or more devices that initiate the print command are associated with the document that comprises the confidential data.

15. A non-transitory computer-readable-storage medium comprising one or more processor-executable instructions that, when executed by at least one processor, are configured to cause the at least one processor to:
verify a print job by virtue of being configured to cause the processor to process print job information, wherein
the print job information is associated with a document comprising a policy information, and
the instructions configured to cause the processor to process the print job information comprise instructions configured to cause the processor to examine the print job information, in response to a print command, wherein
the print job information is associated with the print job, and
the print job is configured to be processed to produce a printed version of a document,
determine whether the document comprises confidential data by calculating a first signature for the document, and processing the first signature using policy information, wherein
the policy information comprises
information indicating that one or more devices support authentication using a Lightweight Directory Access Protocol (LDAP) server,
information for a machine learning technique to identify the confidential data,
an alphanumeric sequence associated with the print job, and
one or more internet protocol addresses of one or more devices associated with the computer system,
the policy information is configured to be used in making a first determination as to whether the document comprises the confidential data,
the first signature is configured to identify the confidential data within the document, and
the processing produces a result that indicates the document comprises the confidential data, in response to the first determination indicating that the document comprises the confidential data, and
make a second determination as to whether to print at least a portion of the document, wherein
the determination is based, at least in part, on the result, and
if the determination indicates that the at least the portion of the document is to be printed, execute instructions to print the at least the portion of the document.

16. The non-transitory computer-readable-storage medium of claim 15, further comprising one or more processor-executable instructions that, when executed by the at least one processor, causes the at least one processor to:
generate an alphanumerical sequence for authenticating the document, in response to the comparison result indicating that the document comprises the confidential data.

17. The non-transitory computer-readable-storage medium of claim 16, wherein the first signature comprises one of a hash value or a fingerprint.

18. The non-transitory computer-readable-storage medium of claim 15, further comprising one or more processor-executable instructions that, when executed by the at least one processor, are configured to cause the at least one processor to:
transmit the print job and the alphanumerical sequence to a destination printer,
communicate instructions to suspend the document from being printed by the destination printer until a matching alphanumerical sequence has been entered by a user at the destination printer,
determine whether a sequence match exists between the alpha numerical sequence and a user-entered alphanumerical sequence, and if the sequence match exists, communicate instructions to print the at least one portion of the document.

19. The non-transitory computer-readable-storage medium of claim 15, further comprising one or more processor-executable instructions that, when executed by the at least one processor, are configured to cause the at least one processor to:
- identify a local printer, wherein
  - the local printer is local to a computer that initiated at least one print job; and
- print the at least one print job by virtue of being configured to route instructions to the local printer.

20. The non-transitory computer-readable-storage medium of claim 15, further comprising one or more processor-executable instructions that, when executed by the at least one processor, are configured to cause the at least one processor to:
- transform the print job information and the policy information into the at least the printed portion of the document.

21. A system comprising:
one or more processors;
a non-transitory computer-readable medium, coupled to the one or more processors and storing instructions, executable on the one or more processors, configured to verify a print job by virtue of being configured to process print job information,
wherein
- the print job information is associated with a document, and
- the instructions configured to process the print job information are configured to
  - examine the print job information, in response to a print command,
    wherein
    - the print job information is associated with the print job, and
    - the print job is configured to be processed to produce a printed version of a document,
  - determine whether the document comprises confidential data by calculating a first signature for the document, and processing the first signature using policy information, wherein
    - the policy information comprises
      - information indicating that one or more devices support authentication using a Lightweight Directory Access Protocol (LDAP) server,
      - information for a machine learning technique to identify the confidential data,
      - an alphanumeric sequence associated with the print job, and
      - one or more internet protocol addresses of one or more devices associated with the computer system,
    - the policy information is configured to be used in making a first determination as to whether the document comprises the confidential data,
    - the first signature is configured to identify the confidential data within the document,
    - the processing produces a result that indicates the document comprises the confidential data, in response to the first determination indicating that the document comprises the confidential data, and
  - make a second determination as to whether to print at least a portion of the document, wherein
    - the determination is based, at least in part, on the result, and
    - if the determination indicates that the at least the portion of the document is to be printed, print the at least the portion of the document.

22. The system of claim 21, further comprising one or more instructions to:
- generate an alphanumerical sequence for authenticating the document, in response to the comparison result indicating that the document comprises the confidential data.

23. The system of claim 22, further comprising one or more instructions to:
- transmit the print job and the alphanumerical sequence to a destination printer,
- suspend the document from being printed by the destination printer until a matching alphanumerical sequence has been entered by a user at the destination printer,
- identify whether a sequence match between the alphanumerical sequence and a user entered alphanumerical sequence exists, and
- print the document, if the sequence match exists.

* * * * *

UNITED STATES PATENT AND TRADEMARK OFFICE
CERTIFICATE OF CORRECTION

PATENT NO. : 8,953,189 B1
APPLICATION NO. : 12/539573
DATED : February 10, 2015
INVENTOR(S) : Mukund S. Agrawal and Karan Khanna It is certified that error appears in the above-identified patent and that said Letters Patent is hereby corrected as shown below:

In the Claims:

Column 13
Line 25, in Claim 9, delete: "comparison"
Line 43, in Claim 11, delete: "comparison"

Column 14
Line 26, in Claim 15, replace: "the computer" by -- a computer --
Line 48, in Claim 16, delete: "comparison"

Column 16
Line 10, in Claim 21, replace: "the computer" by -- a computer --
Line 30, in Claim 22, delete: "comparison"

Signed and Sealed this
Twenty-fourth Day of May, 2016

Michelle K. Lee
*Director of the United States Patent and Trademark Office*